No. 864,145.
PATENTED AUG. 27, 1907.
F. ANDERSON.
COMBINED CALIPERS, SCALE, AND DIVIDERS.
APPLICATION FILED MAR. 28, 1907.
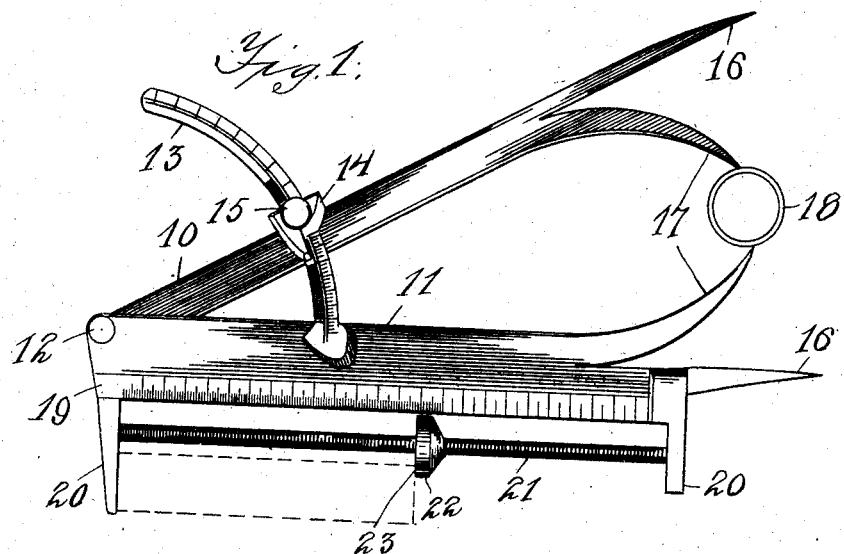
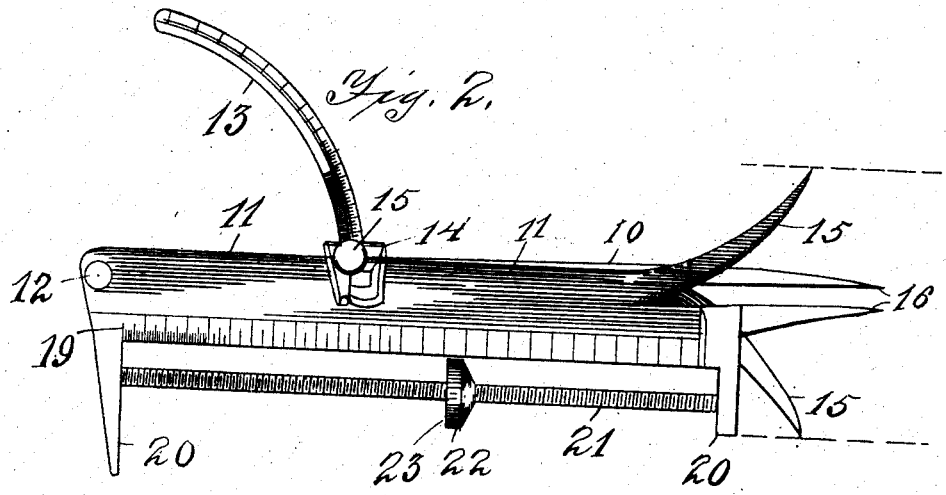
Witnesses
Inventor
Frank Anderson
By S. Arthur Baldwin,
Attorney

UNITED STATES PATENT OFFICE.

FRANK ANDERSON, OF JAMESTOWN, NEW YORK.

COMBINED CALIPERS, SCALE, AND DIVIDERS.

No. 864,145.      Specification of Letters Patent.      Patented Aug. 27, 1907.

Application filed March 28, 1907. Serial No. 364,999.

*To all whom it may concern:*

Be it known that I, FRANK ANDERSON, a citizen of the United States, residing at Jamestown, county of Chautauqua, and State of New York, have invented a new and useful Combined Calipers, Scale, and Dividers, of which the following, taken in connection with the accompanying drawing, is a full, clear, and exact description.

The invention relates to drawing tools and particularly to a combined caliper, scale and dividers; and the object of the improvement is to provide a simple and convenient combination of these three instruments into one so that it can be quickly and accurately used by machinists and others.

In the drawings, Figure 1 is an elevation of the combination tool in the open position; and Fig. 2 is an elevation of the same in the closed position.

Similar numerals refer to corresponding parts in the several views.

The numerals 10 and 11 indicate the two legs of the dividers and calipers which are pivotally attached at their upper end by a suitable rivet 12. A curved scale arm 13 is attached to leg 11 and slidably mounted through a projection 14 on leg 10. A set screw 15 is provided in projection 14 to set the dividers at any desired point on arm 13.

The lower ends of legs 10 and 11 are given a fish-tail form, the points 16 serving as the points for the dividers and the other points 17 are curved inwardly to form caliper points. Being curved inwardly they are much shorter than the points 16 and hence are up out of the way of the said divider points. It is apparent also that the caliper points 17 may be used to obtain the outer measurements of articles, as shown on the tube 18 in Fig. 1, and when closed so that they shut past one another, the inner measurements of tubes and other articles may be obtained, as shown in dotted line in Fig. 2.

The leg 11 is given sufficient width to allow of a scale 19 along its outer edge, jaws 20 being provided at each end of scale 19 and a screw 21 provided with a thumb nut 22 thereon connects jaws 20. One or both sides of nut 22 may be made straight as at 23 to mark the scale divisions and to receive between said straight side and its opposite jaw 20 the piece to be measured.

It is apparent that the exact measurement can thus be obtained and that it is easily retained since the nut 22 stays in position to give the same measurement with exactness as many times as required.

It is apparent that the scale 19 with its screw 21 and set nut 22 may be made separate from my combination tool and serve a good purpose, though not so convenient as where all of the tools are combined.

I claim as new:—

1. A measuring scale consisting of a piece of metal having scale divisions along one side, jaws extending out from said side, a threaded rod extending between said jaws and separated from said scale, and a threaded nut on said rod to mark said scale divisions.

2. A measuring scale consisting of a metal piece having scale divisions thereon, jaws extending out from said metal piece, a threaded rod extending between said jaws and separated from said metal piece, a threaded nut on said rod, said nut having a straight side to mark said scale divisions.

3. In a combination caliper and divider, two legs pivotally connected at one end, the opposite ends of said legs split to form double points, one of said points straight and the other curved, a scale and jaws on one of said legs, and a screw between said jaws and set nut thereon, substantially as shown.

4. A combination caliper and divider, legs 10 and 11 pivotally connected at one end by a rivet 12, the opposite ends of said legs having an integral straight point 16 and a curved point 17, a curved arm 13 on one of said legs, a set nut 15 on the opposite leg to engage said arm, a scale 19 and jaws 20 on one of said legs, a screw 21 and set nut between said jaws.

In testimony whereof I have signed my name to this specification in the presence of two subscribing witnesses.

FRANK ANDERSON.

Witnesses:
     A. W. KETTLE,
     I. A. ELSWORTH.